United States Patent
Yoo et al.

(10) Patent No.: US 10,404,063 B2
(45) Date of Patent: Sep. 3, 2019

(54) PROBABILISTIC MODEL-BASED VIRTUAL DISTRIBUTED RESOURCE MANAGEMENT SYSTEM AND METHOD THEREOF

(71) Applicant: ELECTRONICS AND TELECOMMUNICATIONS RESEARCH INSTITUTE, Daejeon (KR)

(72) Inventors: Yoon Sik Yoo, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 273 days.

(21) Appl. No.: 14/947,349

(22) Filed: Nov. 20, 2015

(65) Prior Publication Data
US 2016/0149407 A1 May 26, 2016

(30) Foreign Application Priority Data

Nov. 25, 2014 (KR) .................. 10-2014-0165591
Nov. 4, 2015 (KR) .................. 10-2015-0154796

(51) Int. Cl.
*H02J 3/00* (2006.01)

(52) U.S. Cl.
CPC .......... *H02J 3/00* (2013.01); *H02J 2003/007* (2013.01); *Y02E 60/76* (2013.01); *Y04S 40/22* (2013.01)

(58) Field of Classification Search
CPC ....... H02J 3/00; H02J 2003/007; Y02E 60/76; Y04S 40/22
See application file for complete search history.

(56) References Cited

U.S. PATENT DOCUMENTS

2004/0024494 A1* 2/2004 Bayoumi ............ H02J 13/0062
    700/286
2004/0044442 A1* 3/2004 Bayoumi .................. H02J 3/00
    700/286

(Continued)

FOREIGN PATENT DOCUMENTS

CN      102402725 A    4/2012
EP      2518665 A1    10/2012

(Continued)

OTHER PUBLICATIONS

Microsoft, Computer Dictionary, 2002, Fifth Edition, pp. 474 (Year: 2002).*

(Continued)

*Primary Examiner* — Brian W Wathen
*Assistant Examiner* — Hung H Dang
(74) *Attorney, Agent, or Firm* — LRK Patent Law Firm (57) ABSTRACT

A probabilistic model-based virtual distributed resource management system includes: a resource collecting unit collecting distributed resource state information from a plurality of distributed resources; and a virtual distributed resource management server monitoring the plurality of distributed resources by using the distributed resource state information collected by the resource collecting unit and changing the distributed resources by calculating availabilities and driving probabilities of the plurality of respective distributed resources.

13 Claims, 6 Drawing Sheets

(56) References Cited

U.S. PATENT DOCUMENTS

| | | | |
|---|---|---|---|
| 2010/0217651 A1* | 8/2010 | Crabtree | G06Q 10/00 705/7.22 |
| 2013/0030784 A1 | 1/2013 | Viassolo et al. | |
| 2013/0035795 A1 | 2/2013 | Pfeiffer et al. | |
| 2013/0207466 A1 | 8/2013 | Lee et al. | |
| 2013/0218356 A1 | 8/2013 | Lee et al. | |

FOREIGN PATENT DOCUMENTS

| | | |
|---|---|---|
| JP | 2013-158081 A | 8/2013 |
| KR | 10-2014-0076037 A | 6/2014 |
| KR | 20150117085 A * | 10/2015 |
| KR | 20150117085 A * | 10/2015 |

OTHER PUBLICATIONS

Yoon-Sik Yoo et al., "An Emergency Generator Asset Management for Virtual Power Plant Infrastructure," International Smart Grid Conference, Oct. 13, 2015 Gwangju, Korea, pp. 303-305.

* cited by examiner

PROBABILISTIC MODEL-BASED VIRTUAL DISTRIBUTED RESOURCE MANAGEMENT SYSTEM AND METHOD THEREOF

CROSS-REFERENCE TO RELATED APPLICATIONS

This application claims priority to and the benefit of Korean Patent Application No. 10-2014-0165591 filed in the Korean Intellectual Property Office on Nov. 25, 2014, Korean Patent Application No. 10-2015-0154796 filed in the Korean Intellectual Property Office on. Nov. 4, 2015, the entire contents of which are incorporated herein by reference.

BACKGROUND OF THE INVENTION

1. Field of the Invention

The present invention relates to a probabilistic model-based virtual distributed resource management system and a method thereof, and more particularly, to a technology that can efficiently integrate and manage distributed energy resources.

2. Description of Related Art

When the existing distributed energy resources cannot receive energy in a power system, power generation resources are locally installed in a building or some areas and the energy is supplied and demanded through the power generation resources.

However, the distributed energy resource management technology in the related art has a problem in that energy of the distributed power generation resources can be supplied only to a building or an adjacent area to which the energy of the distributed resources can be supplied.

In particular, heterogeneous distributed energy resources and countless distributed energy resources installed in a wide area are not integratedly managed even in terms of energy power generation assets, and as a result, utilization of the distributed energy resource which can be used in the case of emergency also deteriorates. As a result, there is a limit in efficient management of the distributed energy resources and energy supply.

Therefore, the distributed energy resources need to be managed as energy power generation assets having systematic and hierarchical shapes and a probabilistic model-based resource needs to be managed so as to supply the distributed energy resources as probabilistically stable distribution demand and power generation resources by monitoring states of the distributed resources for energy supply and demand required in the case of emergency in real time.

SUMMARY OF THE INVENTION

The present invention has been made in an effort to provide a probabilistic model-based virtual distributed resource management system and a method thereof which can stably provide energy to customers by managing states of power generation resources based on energy resources distributed when the customers cannot supply and demand energy from a power system in the case of emergency or power peak by periodically monitoring distributed energy resources.

An exemplary embodiment of the present invention provides a probabilistic model-based virtual distributed resource management system including: a resource collecting unit collecting distributed resource state information from a plurality of distributed resources; and a virtual distributed resource management server monitoring the plurality of distributed resources by using the distributed resource state information collected by the resource collecting unit and changing the distributed resources by calculating availabilities and driving probabilities of the plurality of respective distributed resources.

The probabilistic model-based virtual distributed resource management system may further include a virtual distributed resource operating server analyzing operating cost of distributed resources which are drivable among the distributed resources and providing the analysis result to the virtual distributed resource management server when a drivable resource is reported from the virtual distributed resource management server.

The virtual distributed resource management server may include a monitoring unit monitoring states of the plurality of distributed resources by interworking with the resource collecting unit, an availability analyzing, unit analyzing whether the respective distributed resources are available by using histories of the plurality of distributed resources and the distributed resource state information received from the resource collecting unit, a driving probability calculating unit calculating driving success probabilities of the plurality of distributed resources and determining whether the driving success probabilities of the respective distributed resources are equal to or more than a reference value, and a profile management unit storing and managing profiles for distributed resources adjacent to a target point among the distributed resources in which the driving success probabilities, are equal to or more than the reference value among the plurality of distributed resources.

The availability analyzing unit may analyze the availability by using at least one of past driving times of the plurality of distributed resources, a driving condition, a current power generation state of a distributed resource, and a communication state.

The distributed resource management server may include a scheduling unit clustering the distributed resources adjacent to the target point and scheduling the distributed resources, and a driving request unit requesting a driving to the corresponding distributed resources according to the scheduling.

The driving probability calculating unit may calculate the driving success probability by dividing the number of driving responses of the distributed resources by the number of driving request times, determines whether the driving success probability is higher than an average driving success probability of all distributed resources and lists up distributed resources in which the driving success probabilities are higher than the average driving success probability.

The scheduling unit may determine whether scheduling is available only by the distributed resources of an area adjacent to the target point among the distributed resources in which the driving success probabilities are equal to or more than the reference value and schedule the distributed resources including distributed resources other than the area adjacent to the target point when the scheduling is unavailable.

Another exemplary embodiment of the present invention provides a probabilistic model-based virtual distributed resource management method including: monitoring distributed resources by collecting distributed resource state information from the distributed resources; analyzing availabilities of the distributed resources by using the distributed resource state information and history information of the distributed resources; calculating driving success probabilities of the distributed resources; listing up distributed resources adjacent to a target point based on the driving success probabilities; performing driving scheduling by using the listed up distributed resources; and clustering and changing the distributed resources according to the driving scheduling.

The performing of the driving scheduling may further include performing the driving scheduling the distributed resources including distributed resources other than an area adjacent to the target point when energy supply to the target point is insufficient with the distributed resources adjacent to the target point.

In the calculating of the driving success probabilities of the distributed resources the driving success probabilities may be calculated by dividing the number of driving response times for each distributed resource by the number of driving request times.

In the performing of the driving scheduling by using the listed up distributed resources, distributed resources in which the driving success probability calculated for each distributed resource is higher than an average driving probability of the distributed resources may be listed up.

In the analyzing of the availabilities of the distributed resources, the availability may be determined by usingat least one of a current charge state, a communication state, a driving fuel state, a past driving time, and a driving time of the distributed resource.

In the performing of the driving scheduling by using the listed up distributed resources, operating cost of the distributed resources is analyzed to perform the driving scheduling according to the analysis result.

According to exemplary embodiments of the present invention, distributed demand resources having a high fluctuation probability are hierarchically managed in the case of emergency or power peak as response assets by monitoring assets of power generation resources based on distributed energy resources in real timeand virtual power generation energy is clustered by securing power generation resources suitable for an energy supply and demand pattern of a customer and adjacent to a supply area in the case of emergency or power peak, thereby providing stable energy.

The exemplary embodiments of the present invention are illustrative only, and various modifications, changes, substitutions, and additions may be made without departing from the technical, spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals refer to components of each drawing, it is noted that although the same components are illustrated in different drawings, the same components are referred to by the same reference numerals as possible. In describing the exemplary embodiments of the present invention, when it is determined that the detailed description of the known art related to the present invention may obscure understanding the exemplary embodiments of the present invention, the detailed description thereof will be omitted.

Terms such as first, second, A, B, (a), (b), and the like may be used in describing the components of the exemplary embodiments according to the present invention. The terms are only used to distinguish a constituent element from another constituent element, but nature or an order of the constituent element is not limited by the terms. Further, if it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present invention.

The present invention provides a method that manages a distributed energy resource as an asset so as to provide distributed energy to customers with optimal operating cost through probabilistically more stable energy clustering in the case of power peak or emergency by monitoring a state of the distributed energy resource in real time and determining a profile of a distributed resource, the number of response success times, and an adjacent area condition which is responsive at normal times and a system thereof.

Hereinafter, exemplary embodiments of the present invention will be described in detail with reference to FIGS. 1 to 7.

Figure 1:
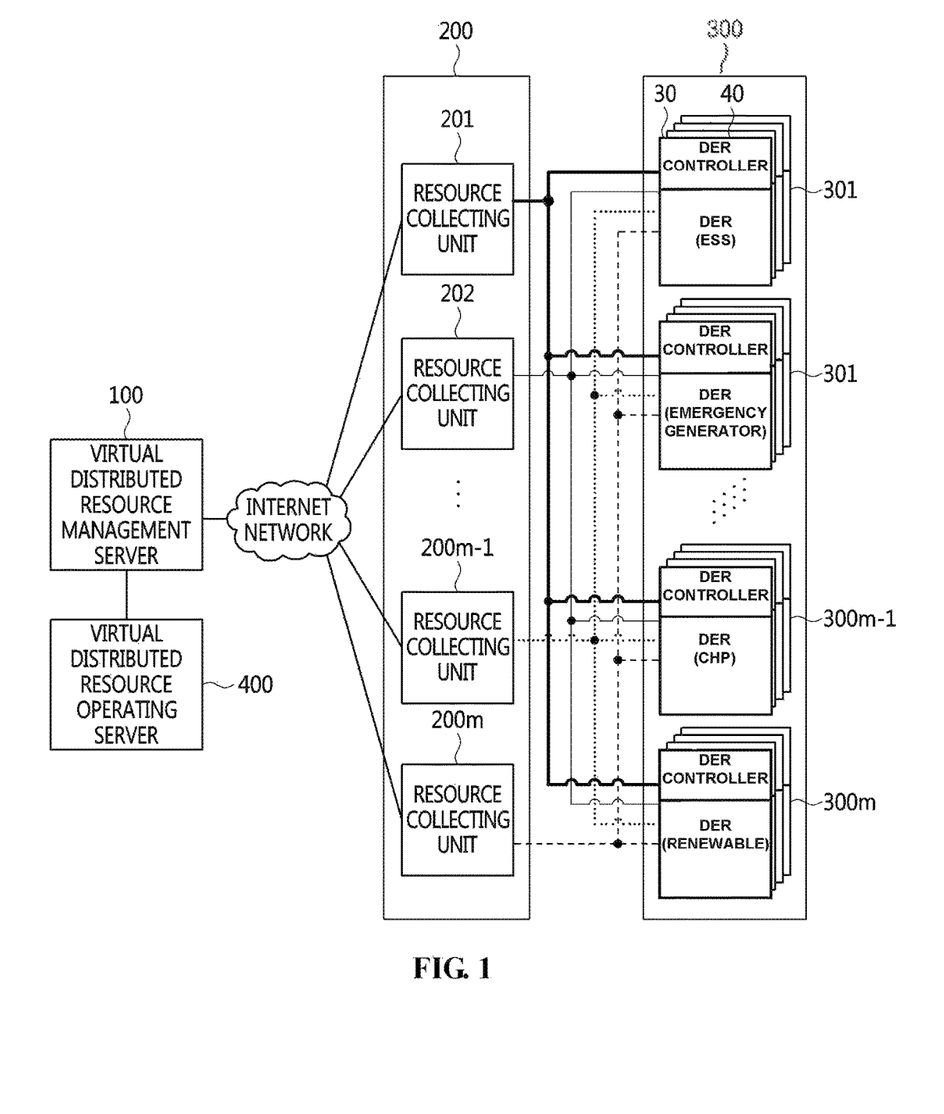
FIG. 1 is a configuration diagram of a probabilistic model-based virtual resource management system according to an exemplary embodiment of the present invention.

FIG. 1 is a configuration diagram of a probabilistic model-based virtual resource management system according to an exemplary embodiment of the present invention.

The probabilistic model-based virtual resource management system according to the exemplary embodiment of the present invention includes a virtual distributed resource management server 100, a plurality of resource collecting units 200 connected with the virtual distributed resource management server 100 through an Internet network, a plurality of distributed energy resources 300 managed by the plurality of resource collecting units 200, respectively, and a virtual distributed resource operating server 400.

The virtual distributed resource management server 100 supplies stable energy to customers in the case of emergency or power peak. That is, the virtual distributed resource management server 100 hierarchically manages the respective distributed energy resources 300 as power generation resource assets and virtually clusters energy resources to supply the energy to the customers with optimal operating cost. In this case, the customers mean houses, factories, buildings, and the like requiring power. To this end, the virtual distributed resource management server 100 monitors states of distributed resources by collecting state information of the distributed resources through the resource collecting unit 200, analyzes availability of the distributed resources by using the state information and history information of the distributed resources and thereafter, calculates a driving success probability for distributed resources which are available and lists up distributed resources in which the driving success probability is equal to or more than a reference value and thereafter, performs driving scheduling by using the listed up distributed resources to driving the corresponding distributed resources by clustering.

The resource collecting unit 200 physically clusters the distributed energy resources 300 and provides the state information of the distributed energy resources to the virtual distributed resource management server 100 through the Internet network. The distributed energy resources 300 include a distributed energy resource controller controlling the energy resources and the distributed energy resources provided to the customers. Examples of the distributed energy resources include new regeneration energy (sunlight, wind power, and the like), cogeneration energy, an emergency generator, an energy storage device and the like and the various distributed energy resources may be constructed in the building or around an area.

The virtual distributed resource operating server 400 analyzes operating cost of drivable distributed resources by interworking with the virtual distributed resource management server 100 to provide history information related to a distributed resource having optimal cost to the virtual distributed resource management server 100.

Figure 2:
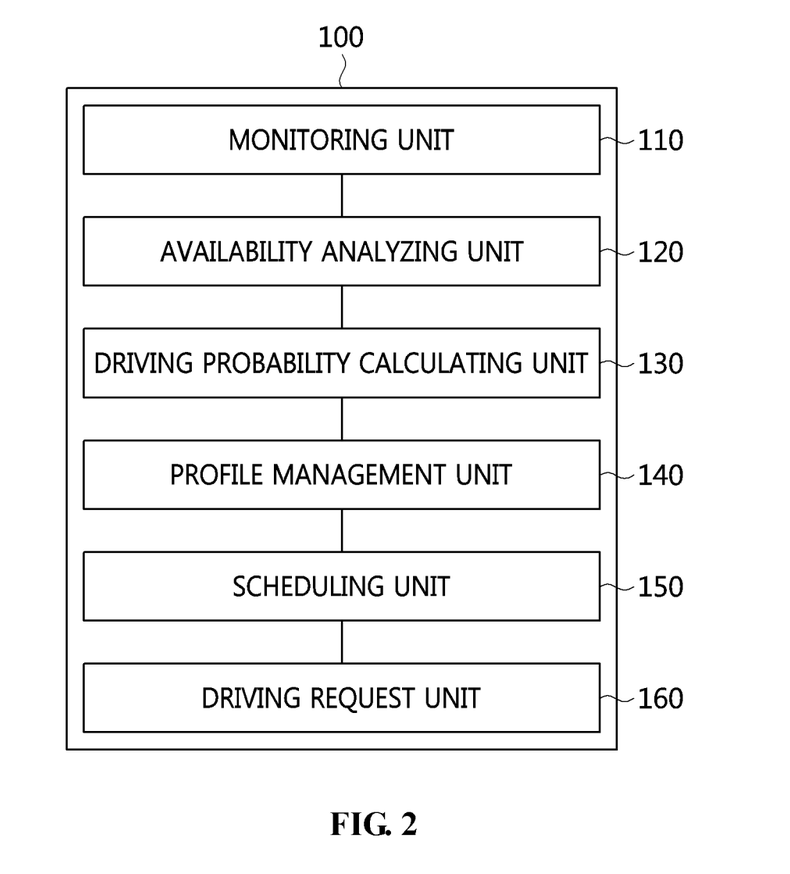
FIG. 2 is a detailed configuration diagram of a resource management server according to the exemplary embodiment of the present invention.

FIG. 2 is a detailed configuration diagram of a resource management server 100 according to the exemplary embodiment of the present invention.

The resource management server 100 according to the exemplary embodiment of the present invention includes a monitoring unit 110, an availability analyzing unit 120, a driving probability calculating unit 130, a profile managing unit 140, a scheduling unit 150, and a driving request unit 160.

The monitoring unit 110 monitors states of a plurality of distributed resources by interworking with the resource collecting unit 200.

The availability analyzing unit 120 analyzes whether the respective distributed resources are available by using the history information of the plurality of distributed resources and the distributed resource state information received from the resource collecting unit 200. The availability analyzing unit 120 may analyze the availability by using at least one of past driving times of a plurality of distributed resources, a driving condition, a power generation state of a current distributed resource, and a communication state.

The driving probability calculating unit 130 calculates the driving success probabilities of the plurality of distributed resources and determines whether the driving success probabilities of the respective distributed resources are equal to or more than a reference value. The driving probability calculating unit 130 calculates the driving success probability by dividing the number of driving responses of the distributed resources by the number of driving request times, determines whether the driving success probability is higher than an average driving success probability of all distributed resources, and lists up distributed resources in which the driving success probabilities are higher than the average driving success probability to manage a profile.

The asset profile managing unit 140 stores and manages profiles for distributed resources adjacent to a target point among the distributed resources in which the driving success probabilities are equal to or more than the reference value among the plurality of distributed resources.

The scheduling unit 150 clusters the distributed resources adjacent to the target point and schedules the listed up distributed resources. The scheduling unit 150 determines whether scheduling is available only by the distributed resources of an areaadjacent to the target point among the distributed resources in which the driving success probabilities are equal to or more than the reference value and schedules the distributed resources including distributed resources other than the area adjacent to the target point when the scheduling is unavailable.

The driving request unit 160 requests a driving to the corresponding distributed resources according to the scheduling.

Figure 3:
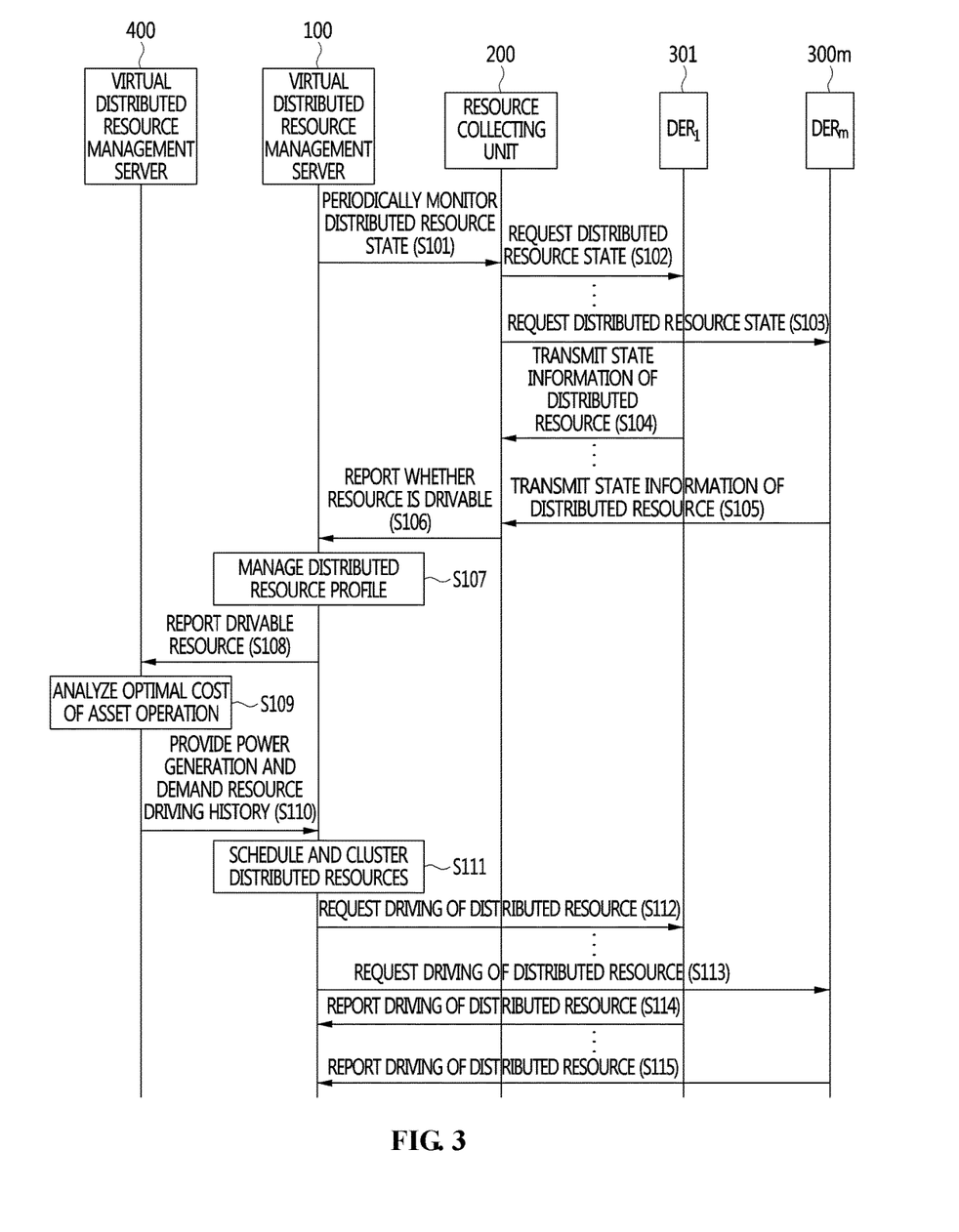
FIG. 3 is a flowchart illustrating a distributed resource responding method of a probabilistic model-based virtual resource management system according to an exemplary embodiment of the present invention.

Hereinafter, a distributed resource management flow for virtual power generation energy clustering of distributed energy resources according to an exemplary embodiment of the present invention will be described with reference to FIG. 3.

First, the virtual distributed resource management server 100 periodically requests distributed resource state monitoring to the resource collecting unit 200 (S101).

Therefore, the resource collecting unit 200 requests distributed resource state information to various distributed energy resources 300 (S102 and S103) and the distributed energy resources 300 that are requested transfer the state information of the distributed resources to the resource collecting unit 200 (S104 and S105). In this case, the distributed resource state information may include a power generation state, a manual control mode or not, a charge state, a driving fuel state, a networking state, and the like.

Thereafter, the resource collecting unit 200 reports information on whether the distributed resources are drivable to the virtual distributed resource management server 100 by using the distributed resource state information of the distributed energy resources 300 (S106). In this case, the resource collecting unit 200 determines whether the corresponding distributed resource is drivable according to the charge state of the distributed resource, whether networking (communication) is available, the manual control mode or not, and the like. That is, the resource collecting unit 200 determines that a driving of the distributed resources is available when the charge state of the distributed resource is high, when the networking is available, or when the manual control mode is not available and determines that the driving of the distributed resources is unavailable when the charge state is low, when the networking is unavailable, or when the manual control mode is available. Herein, the manual control mode means not a remote control but a state in which an operator is capable of manually controlling the distributed resources on the spot in person.

Subsequently, the virtual distributed resource management server 100 recognizes the state of the distributed resource by using the information on whether the distributed resource is drivable and the distributed resource state information reported from the resource collecting unit 200 and manages the profile of the distributed resource adjacent to the target point based on the driving probability of each distributed resource (S107).

That is, the virtual distributed resource management server 100 continuously updates the existing information to recent information while monitoring the locations and the driving states of the distributed resources by using the information on whether the distributed resource is drivable and the distributed resource state information reported from the resource collecting unit 200. Further, the virtual distributed resource management server 100 analyzes the availability of each distributed resource by using the history information related to each distributed resource, which is prestored and the information on whether the distributed resource is drivable and the distributed resource state information reported from the resource collecting unit 200. Further, the virtual distributed resource management server 100 calculates whether each distributed resource is drivable in the case of emergency or power peak based on a probabilistic model. Further, the virtual distributed resource management server 100 clusters and manages profiles of distributed resources of an area adjacent to the target point among the distributed resources in which the driving success probabilities are high. In this case, the target point means an area of a customer requiring energy.

Thereafter, the virtual distributed resource management server 100 provides information on the distributed resource which are drivable based on the driving probability to the virtual distributed resource operating server 400 (S108).

Therefore, the virtual distributed resource operating server 400 analyzes an optimal point of operating cost of the distribute resource asset which is drivable (S109). In this case, the virtual distributed resource operating server 400 may analyze the operating cost by using information such as a distance from the target point to the corresponding distributed resource, fuel of the corresponding distributed resource, and the like.

Subsequently, the virtual distributed resource operating server 400 provides driving history information including the operating cost of the distributed resource, and the like to the virtual distributed resource management server 100 (S110).

Thereafter, the virtual distributed resource management server 100 schedules the distributed resource by using the driving history information received from the virtual distributed resource operating server 400 and the profile information of the distributed resource adjacent to the target point and clusters the corresponding distributed resource (S111).

Thereafter, the virtual distributed resource management server 100 requests power generation resource driving to respective distributed resources 301 to 300m according to a distributed resource scheduling plan (S112 and S113) and receives drivings and driving results from the respective distributed resources 301 to 300m (S114 and S115). In this case, the virtual distributed resource management server 100 provides history information in which driving the distributed resource starts to the virtual distributed resource operating server 400 to allow the virtual distributed resource operating server 400 to manage the history information.

Figure 4:
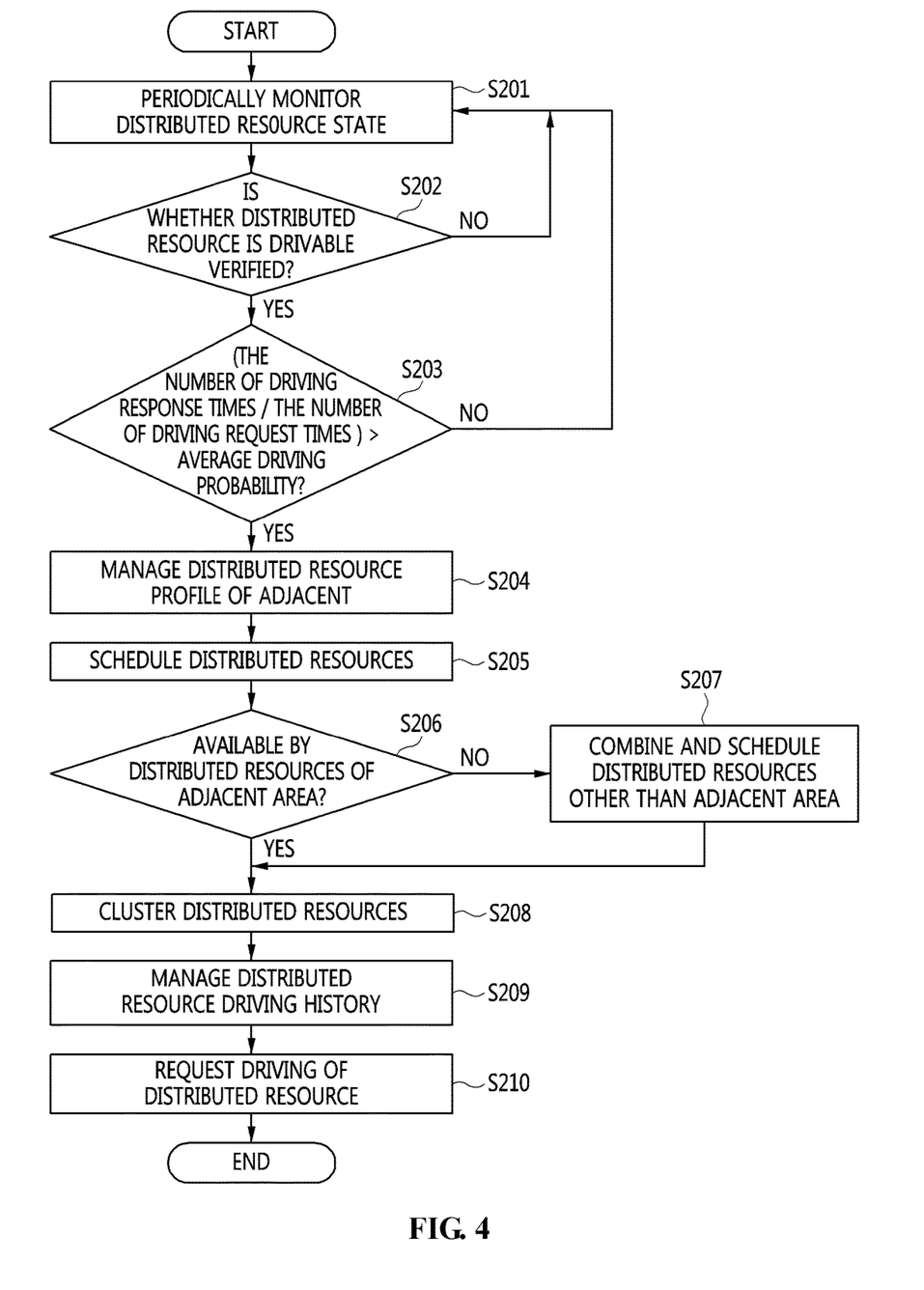
FIG. 4 is a flowchart illustrating a method for managing distributed resources of a virtual distributed resource management server according to an exemplary embodiment of the present invention.

Hereinafter, a method for managing distributed resources of a virtual distributed resource management server according to an exemplary embodiment of the present invention will be described in detail with reference to FIG. 4.

The virtual distributed resource management server 100 periodically monitors states of distributed resources (S201).

The virtual distributed resource management server 100 verifies whether assets of the distributed resources are available by using state information of the distributed resources and history information of the distributed resources (S202). That is, the virtual distributed resource management server 100 determines whether the corresponding distributed resource by using information including a past driving time of the distributed resource, a driving condition, whether the distributed resource is drivable in the case of emergency, and the like and information including a charge state of the distributed resource received from the resource collecting unit 200, whether networking (communication) is available, and the like by using the history information of the distributed resource.

Thereafter, the virtual distributed resource management server 100 calculates a driving success probability of the distributed resource (S203). That is, the driving success probability of the corresponding distributed resource may be calculated by dividing the number of driving response times by the number of driving request times. The virtual distributed resource management server 100 determines whether the driving success probability of the distributed resourcesis higher than an average driving probability of all distributed resources. That is, the virtual distributed resource management server 100 determines that the driving success probability is the higher when the driving success probability is higher than an average driving probability and lists up the corresponding distributed resource as a distributed resource which may be used in the case of emergency or power peak.

Subsequently, the virtual distributed resource management server 100 manages and clusters profiles of distributed resources adjacent to a target point to which energy is to be supplied among distributed resources in which the driving success probabilities are high (S204).

That is, the virtual distributed resource management server 100 clusters power generation resources adjacent to the target point when the driving probability is equal to or more than a reference value in the case of emergency or power peak and continuously verifies whether the assets of the power generation resources are available by returning to step S201 when the driving probability is less than the reference value in the case of emergency or power peak.

As such, the virtual distributed resource management server 100 clusters the distributed resources and thereafter, plans an actuation schedule of the distributed resources which are drivable (S205). In this case, the driving time may be adjusted by considering variables including power generation amounts, power generation duration, power generation stabilities, and like of various distributed energy resources.

In this case, it is determined whether desired energy may be supplied only by the adjacent distributed resources (S206) and when the desired energy may not be supplied only to the adjacent distributed resources, the distributed resources including distributed resources in which the driving success probabilities are higher than the average driving probability among the distributed resources other than the adjacent area are scheduled (S207).

When the driving schedule is determined as described above, the virtual distributed resource management server 100 clusters the distributed resources according to the scheduling (S208) and stores distributed resource driving history information (S209).

Thereafter, the virtual distributed resource management server 100 requests the driving to the corresponding distributed resources (S210). In this case, due to various characteristics of the distributed energy resources, at the time of independently requesting the power generation driving to one type of distributed resource, it is difficult to stably supply energy, and as a result, the distributed resources are swung by clustering.

Thereafter, the virtual distributed resource management server 100 provides and stores the driving history of the power generation resource driven for energy supply and demand which may occur in the case of emergency to and in the virtual distributed resource operating server 400 to manage a history of the distributed resource so as to drive the distributed resource with optimal operating cost.

FIGS. 5A to 5D illustrate power generation patterns and power generation times of various distributed resources according to an exemplary embodiment of the present invention. In the present invention, energy may be supplied and demanded with optimal operating cost in the case of emergency by using power generation characteristics and driving probabilities of distributed energy resources. Consequently, when various distributed energy resources are present in the same area and the power generation resources are available, n distributed energy resources may be used by clustering.

However, when various distributed energy resources are not present in the same area, optimal available resources are constituted by virtual power generation energy to supply and demand energy. Herein, a probability mass function of X which is each distributed resource is shown in Equation 1 given below.

$$P_X = \binom{n}{k} p^x (1-p)^{n-x} \quad \text{[Equation 1]}$$

X may be defined as a binomial (n, p) random variable. Herein, p is in the range of 0<P<1 and n is, an integer which is n≥1 equal to or larger than 1. The number of success times in n independent operations in which the driving success probability is p is continuously the binomial random variable. In general, n is the number of operation times and p is the driving success probability with respect to the binomial (n, p) random variable.

Figure 5A:
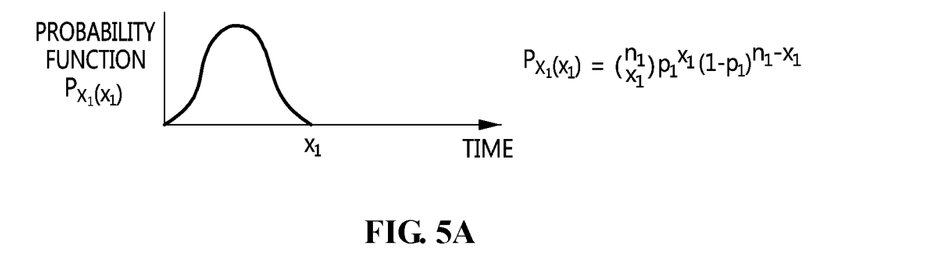
FIG. 5A is a graph illustrating a power generation pattern and a power generation time of a first distributed resource according to an exemplary embodiment of the present invention.
Figure 5B:
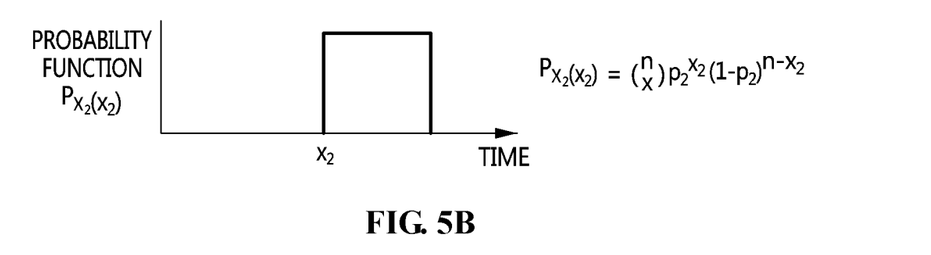
FIG. 5B is a graph illustrating a power generation pattern and a power generation time of a second distributed resource according to an exemplary embodiment of the present invention.
Figure 5C:
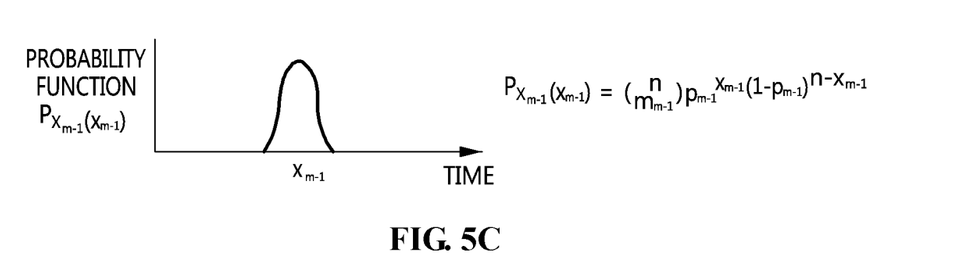
FIG. 5C is a graph illustrating a power generation pattern and a power generation time of a third distributed resource according, to an exemplary embodiment of the present invention.
Figure 5D:
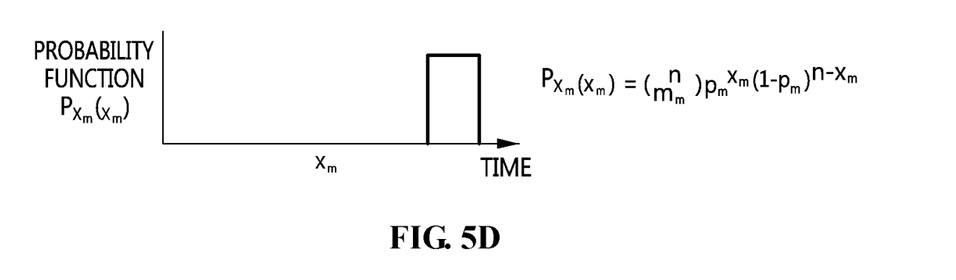
FIG. 5D is a graph illustrating a power generation pattern and a power generation time of a fourth distributed resource according to an exemplary embodiment of the present invention.

FIG. 5B is an example of defining a driving success probability model for a second distributed resource, FIG. 5C is an example of defining a driving success probability model for a last second distributed resource, and FIG. 5D is an example of defining a driving success probability model for a last distributed resource. The probability model is not limited to the probability model presented in the present invention and may be defined by various methods.

Figure 6:
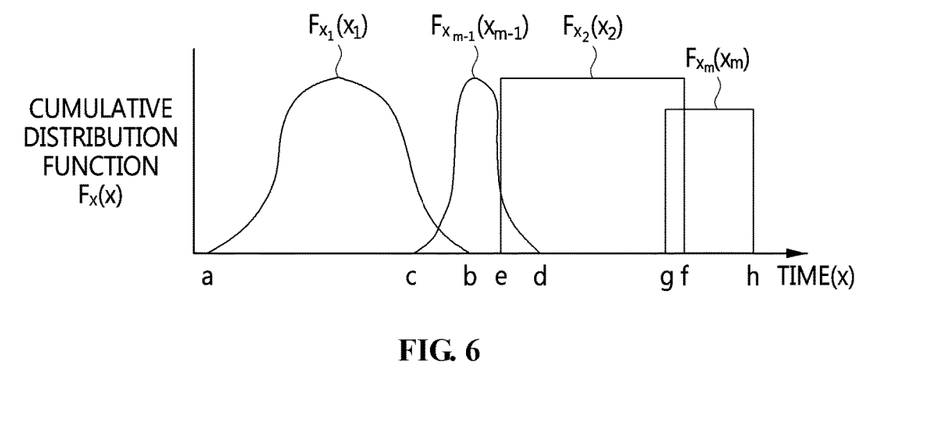
FIG. 6 is a graph for describing a method for approximating driving scheduling of distributed resources according to an exemplary embodiment of the present invention.

FIG. 6 illustrates an approximation method of driving scheduling of distributed power generation resources. As illustrated in FIG. 5, a cumulative distribution function of a random variable X may be defined as shown in Equation 2 given below.

$$F_X(x) = P[X \leq x] \quad \text{[Equation 2]}$$

That is, a cumulative distribution function means a probability that the random variable X will not be larger than x with respect to a predetermined real number x.

Therefore, $F_X(b) - F_X(a) = P[a < X \leq b]$ is established for all b≤a. The cumulative distribution function of the respective distributed resources may be expressed as shown in Equation 3 given below.

$$F_{X_1}(b) - F_{X_1}(a) = P[a < X \leq b]$$

$$F_{X_2}(f) - F_{X_2}(e) = P[e < X \leq f]$$

$$F_{X_{m-1}}(d) - F_{X_{m-1}}(c) = P[c < X \leq d]$$

$$F_{X_m}(h) - F_{X_m}(g) = P[g < X \leq h] \quad \text{[Equation 3]}$$

In this case, an expectation value of the random variable X which is the distributed resource may be derived. That is, since all measurement values are added and the added value is divided by the number of terms, the expectation value of the random variable X may be marked with E[X] or $\mu_X$. Therefore, the expectation value of X is defined as $$E[X] = \mu_X = \sum_{x \in S_x} x P_x(x).$$

Consequently, the expectation value for the binomial (n, p) random variable X becomes E[X]=np. Therefore, driving expectation values of the respective distributed resources are shown in Equation 4 given below.

$$E[X_1] = np_1$$

$$E[X_2] = np_2$$

$$E[X_{m-1}] = np_{m-1}$$

$$E[X_m] = np_m \quad \text{[Equation 4]}$$

A distributed resource having a high driving probability in section [a, b] is prepared by considering a characteristic of a power generation resource showing a graph of a progress illustrated in FIG. 6 and energy needs to be stably provided to customers by extracting distributed resources adjacent to the target point from a distributed resource profile. In this case, when there is a plurality of distributed resource assets having the high driving probability in section [a, b], the distributed resources are clustered and swung. In the case where the distributed resource having the high driving probability is present in sections [a, b] and [e, g], but a distributed resource in which the driving probability is high is not present in section [b, e], when a distributed resource in which the driving probability is high is present in section [c, d] including section [b, e], the corresponding distributed resources are consecutively swung to provide energy to the customers. That is, the distributed resource having the high driving probability is selected to cluster distributed resources adjacent to the target point and a supply and demand plan of the virtual power generation energy using an energy storage device or other distributed energy resources is optimized.

As such, in the present invention, when the customers may not be supplied with energy from the power system in the case of emergency or power peak by periodically monitoring the distributed energy resource, the virtual power generation energy may be clustered and supplied with optimal operating cost so as to stably provide energy to the customers by managing a state of a power generation resource based on the distributed energy resources.

Figure 7:
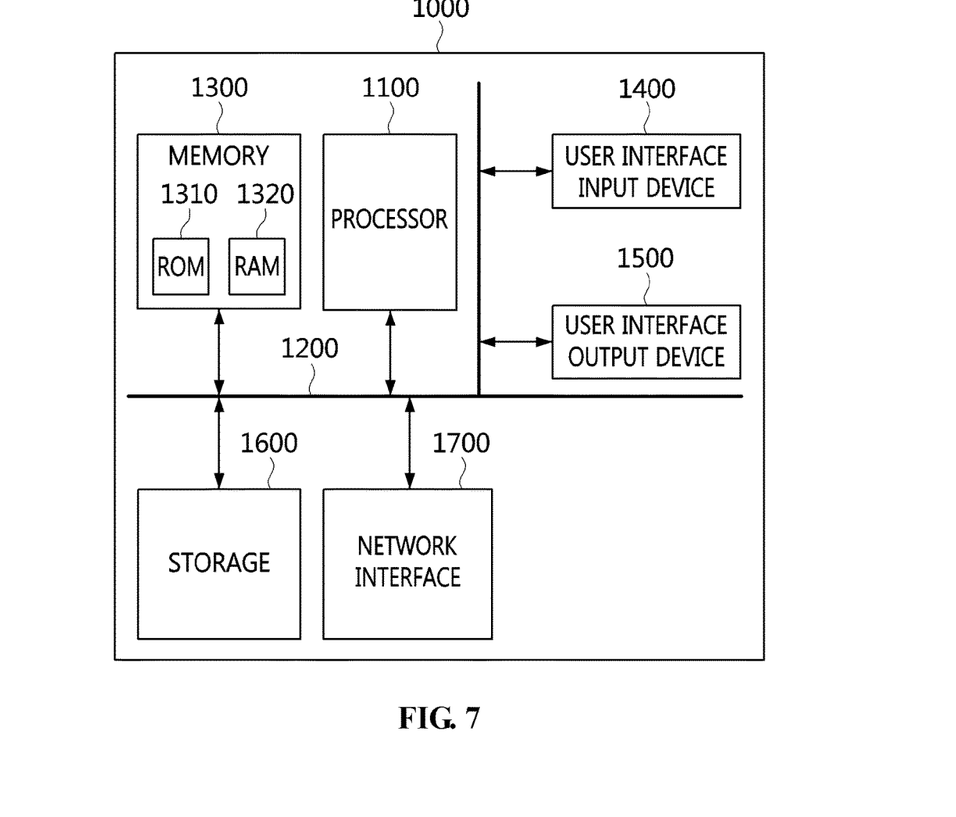
FIG. 7 is a configuration diagram of a computer system to which a distributed resource management system is applied according to an exemplary embodiment of the present invention.

FIG. 7 is a configuration diagram of a computer system to which a distributed resource management system is applied according to an exemplary embodiment of the present invention.

Referring to FIG. 7, a computing system 1000 may include at least one processor 1100, a memory 1300, a user interface input device 1400, a user interface output device 1500, a storage 1600, and a network interface 1700 connected through a bus 1200.

The processor 1100 may be a central processing unit (CPU) or a semiconductor device that executes processing of commands stored in the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

The above description is illustrative purpose only and various modifications and transformations become apparent to those skilled in the art within a scope of an essential characteristic of the present invention.

Therefore, the exemplary embodiments disclosed in the present invention are used to not limit but describe the technical spirit and the scope of the technical spirit of the present invention is not limited by the exemplary embodiments. Therefore, the spirit of the present invention should not be limited to the above-described exemplary embodiments, and the following claims as well as all modified equally or equivalently to the claims are intended to fall within the scope and spirit of the invention.

What is claimed is:

1. A probabilistic model-based virtual distributed resource management system comprising:
   one or more units being configured and executed by one or more servers including at least one processor using one or more sequences of instructions, which when executed, cause the one or more servers to perform the one or more units, the servers and units comprising,
   a resource collecting unit collecting distributed resource state information from a plurality of distributed resources;
   a virtual distributed resource management server monitoring the plurality of distributed resources by using the distributed resource state information collected by the resource collecting unit and changing the distributed resources by calculating availabilities and driving probabilities of the plurality of respective distributed resources,
   wherein a scheduling unit schedules the distributed resources in which the driving probabilities are equal to or more than a reference value for each time section to the corresponding time section,
   when there is no distributed resource in which the driving probability is equal to or more than the reference value for a one time section of time sections, the scheduling unit determines an extended time section which includes the one time section and one or more time sections consecutive to the one time section, and schedules the distributed resources in which the driving probabilities are equal to or more than the reference value for the one or more time sections to the extended time section, and
   wherein the scheduling unit schedules the distributed resources consecutively to the one time section and the one or more time sections.

2. The probabilistic model-based virtual distributed resource management system of claim 1, further comprising:
   a virtual distributed resource operating server analyzing operating cost of distributed resources which are drivable among the distributed resources and providing the analysis result to the virtual distributed resource management server when a drivable resource is reported from the virtual distributed resource management server.

3. The probabilistic model-based virtual distributed resource management system of claim 1, wherein the virtual distributed resource management server includes
   a monitoring unit monitoring states of the plurality of distributed resources by interworking with the resource collecting unit,
   an availability analyzing unit analyzing whether the respective distributed resources are available by using histories of the plurality of distributed resources and the distributed resource state information received from the resource collecting unit,
   a driving probability calculating unit calculating driving success probabilities of the plurality of distributed resources and determining whether the driving success probabilities of the respective distributed resources are equal to or more than a reference value, and
   a profile managing unit storing and managing profiles for distributed resources adjacent to a target point among the distributed resources in which the driving success probabilities are equal to or more than the reference value among the plurality of distributed resources.

4. The probabilistic model-based virtual distributed resource management system of claim 3, wherein the availability analyzing unit analyzes the availability by using at least one of past driving times of the plurality of distributed resources, a driving condition, a current power generation state of a distributed resource, and a communication state.

5. The probabilistic model-based virtual distributed resource management system of claim 3, wherein the distributed resource management server includes a scheduling unit clustering the distributed resources adjacent to the target point and scheduling the distributed resources, and a driving request unit requesting a driving to the corresponding distributed resources according to the scheduling.

6. The probabilistic model-based virtual distributed resource management system of claim 3, wherein the driving probability calculating unit calculates the driving success probability by dividing the number of driving responses of the distributed resources by the number of driving request times, determines whether the driving success probability is higher than an average driving success probability of all distributed resources, and lists up distributed resources in which the driving success probabilities are higher than the average driving success probability.

7. The probabilistic model-based virtual distributed resource management system of claim 5, wherein the scheduling unit determines whether scheduling is available only by the distributed resources of an area adjacent to the target point among the distributed resources in which the driving success probabilities are equal to or more than the reference value and schedules the distributed resources including distributed resources other than the area adjacent to the target point when the scheduling is unavailable.

8. A computer-implemented probabilistic model-based virtual distributed resource management method comprising:

monitoring distributed resources by collecting distributed resource state information from the distributed resources;

analyzing availabilities of the distributed resources by using the distributed resource state information and history information of the distributed resources;

calculating driving success probabilities of the distributed resources;

listing up distributed resources adjacent to a target point based on the driving success probabilities;

performing driving scheduling by using the listed up distributed resources; and clustering and changing the distributed resources according to the driving scheduling, wherein the performing driving scheduling includes scheduling the listed distributed resources in which the driving success probabilities are equal to or more than a reference value for each time section to the corresponding time section, when there is no listed distributed resource in which the driving success probabilities are equal to or more than the reference value for a one time section of time sections, wherein the performing driving scheduling includes determining an extended time section which includes the one time section and one or more time sections consecutive to the one time section, and scheduling the listed distributed resources in which the driving success probabilities are equal to or more than the reference value for the one or more time sections to the extended time section, and wherein the performing driving scheduling includes scheduling the distributed resources consecutively to the one time section and the one or more time sections.

9. The probabilistic model-based virtual distributed resource management method of claim 8, wherein the performing of the driving scheduling further includes performing the driving scheduling the distributed resources including distributed resources other than an area adjacent to the target point when energy supply to the target point is insufficient with the distributed resources adjacent to the target point.

10. The probabilistic model-based virtual distributed resource management method of claim 9, wherein in the calculating of the driving success probabilities of the distributed resources, the driving success probabilities are calculated by dividing the number of driving response times for each distributed resource by the number of driving request times.

11. The probabilistic model-based virtual distributed resource management method of claim 9, wherein in the performing of the driving scheduling by using the listed up distributed resources, distributed resources in which the driving success probability calculated for each distributed resource is higher than an average driving probability of the distributed resources are listed, up.

12. The probabilistic model-based virtual distributed resource management method of claim 8, wherein in the analyzing of the availabilities of the distributed resources, the availability is determined by using at least one of a current charge state, a communication state, a driving fuel state, a past driving time, and a driving time of the distributed resource.

13. The probabilistic model-based virtual distributed resource management method of claim 8, wherein in the performing of the driving scheduling by using the listed up distributed resources, operating cost of the distributed resources is analyzed to perform the driving scheduling according to the analysis result.

* * * * *